April 4, 1950  C. V. McGUIRE  2,503,164
PNEUMATIC CELLULAR STRUCTURE
Filed Jan. 10, 1949
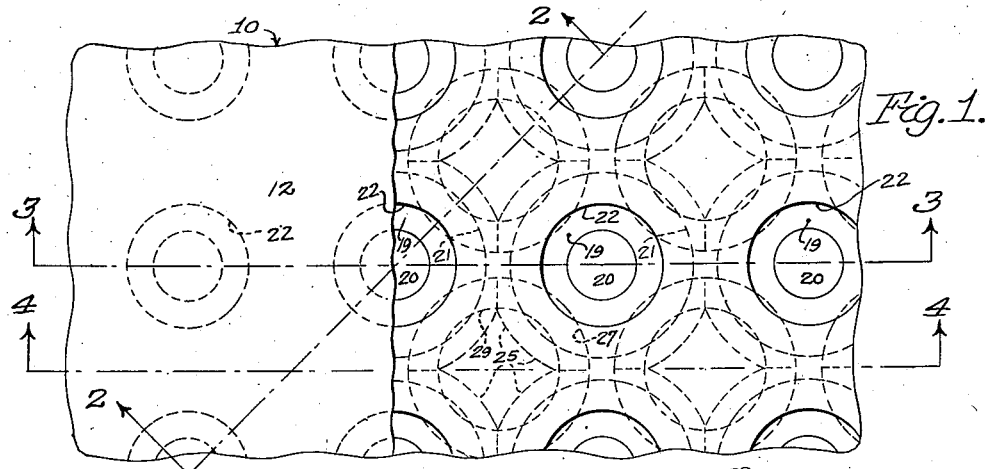
Fig. 1.
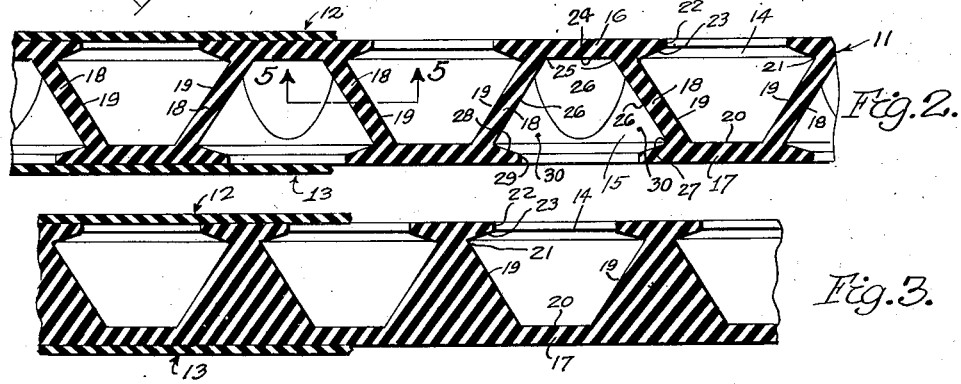
Fig. 2.
Fig. 3.
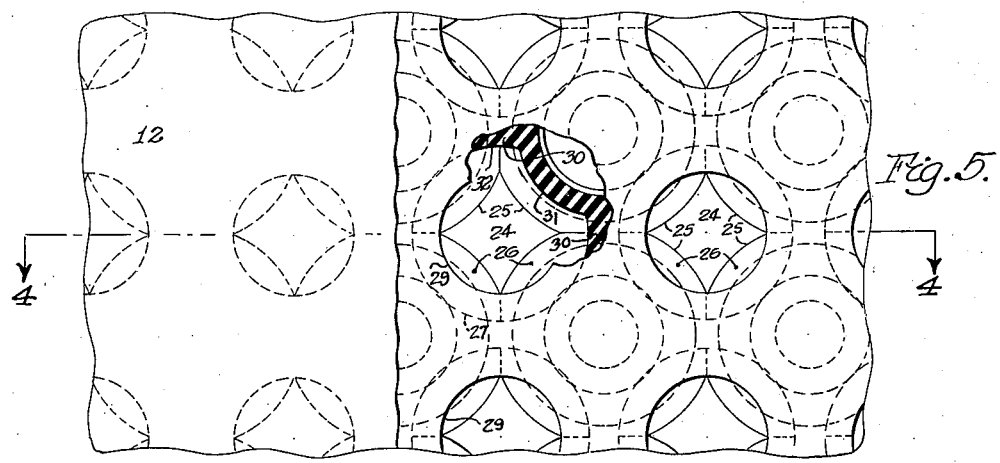
Fig. 5.
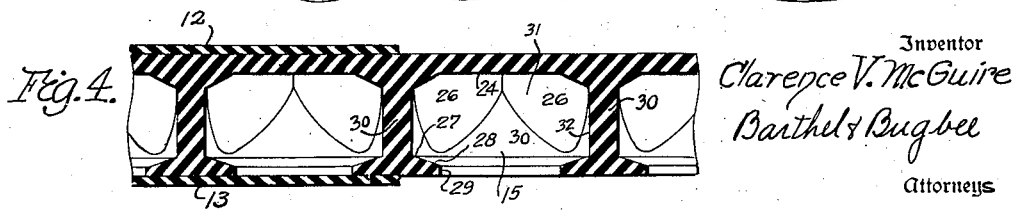
Fig. 4.
Inventor
Clarence V. McGuire
Barthel & Bugbee
Attorneys Patented Apr. 4, 1950

2,503,164

UNITED STATES PATENT OFFICE 2,503,164

PNEUMATIC CELLULAR STRUCTURE

Clarence V. McGuire, Grosse Pointe, Mich.

Application January 10, 1949, Serial No. 70,041

9 Claims. (Cl. 154—49)

This invention relates to pneumatic cellular structures and, in particular, to cellular pads or mats of rubber-like material.

One object of this invention is to provide a pneumatic cellular structure of rubber-like material which will provide the maximum volume of cell space with a minimum volume of wall space between cells so that the structure will possess the maximum amount of resilience.

Another object is to provide a pneumatic cellular structure wherein the cells are of roughly frusto-conical shape arranged alternately and extending inward from opposite sides of the structure, the cells on one side being of slightly different configuration from the cells on the other side, their walls being indented in such a manner as to maintain the thinnest possible walls and, therefore, to prevent stiffness at various points in prior pneumatic cellular structures resulting from thickened walls at those points.

In the drawings:

Figure 1 is a fragmentary top plan view of a portion of a pneumatic cellular structure, according to a preferred form of the invention, with the upper sealing sheet broken away to disclose the cell construction viewed from the upper side of the structure;

Figure 2 is a vertical section along the oblique line 2—2 in Figure 1;

Figure 3 is a vertical section along the line 3—3 in Figure 1;

Figure 4 is a vertical section along the lines 4—4 in Figures 1 and 5; and

Figure 5 is a fragmentary bottom plan view of the portion of the pneumatic cellular structure shown in Figure 1, with a portion of the lower sealing sheet broken away to disclose the cell construction viewed from the lower side of the structure and partly in section along the line 5—5 in Figure 2.

Cellular mats or cushions have been provided hitherto for various purposes, such as for cushion insoles of shoes, for anti-fatigue mats, for kneeling or standing purposes, and for shock and vibration absorbing purposes. Such pneumatic cellular structures are shown, for example, in my previous Patents No. 2,189,813 of February 13, 1940, for Composite pneumatic material, and No. 2,268,049 of December 30, 1941, for Method of making composite material, the latter being a division of the former.

In such mats or cellular structures, the cells extend inward from opposite sides of the structure, which is of plate-like form, the cells on opposite sides of the structure being of substantially the same shape and symmetrical around an axis of revolution—to describe them geometrically. In my prior patents just mentioned, the cells on opposite sides of the structure are of approximately frusto-conical shape—that is, each cell is approximately the shape of the frustum of a cone. In these prior structures, however, the wall thickness between the adjacent cells varies considerably from point to point, with the result that the thickest portions of the wall possess more stiffness than the thinner portions, so that the resilience of the structure varies considerably from point to point, depending upon the cellular wall thickness at that point. The structure, of course, reaches its maximum resilience immediately above the center of each cell remote from its walls and depending primarily upon the entrapped air for the resilient effect.

The pneumatic cellular structure of the present invention minimizes this variation of resilience by modifying the shape of the cells extending inward from one side of the structure so that they are no longer of frusto-conical shape, but, in contrast, the side walls have indented portions which are inwardly curved while slanting toward the bottom of the cell from four different directions. The lower cells, therefore, are partially cylindrical in shape with the indented arcuate portions slanting toward the bottom of the cell. In other words, the cellular structure of the present invention includes frusto-conical cells extending inward from one side and modified cylindrical cells extending inward from the other side, the shape of the cylindrical cells being modified into partially conical form and yielding to the conical side walls of the frusto-conical cells, with the result that the partially cylindrical cells have sloping arcuate conical side wall portions at the locations where the frusto-conical cells intersect the cylindrical cells.

It will be understood that the terms "upper" and "lower" cells as used herein are purely relative, since the frusto-conical cells could obviously be placed on the bottom side and the modified cylindrical cells on the top side. This construction results in keeping the cell side walls as nearly uniform in thickness as possible. This, in turn, maintains the resilience of the structure as nearly uniform as possible, particularly at points immediately over the side walls of the cells. Variations in the thickness of the cell walls are not particularly noticeable when thin sheets of the material are used, as in certain types of footwear, such as cements or light welts, but when thicker material is required, as in anti-fatigue floor mats, these variations are accentuated.

Referring to the drawings in detail, Figures 1 to 5 inclusive show a fragmentary portion of a pneumatic cellular structure generally designated 10, in the form of a mat or cushion which, in turn, consists generally of a plate-like cellular body 11 of elastic deformable material, such as natural or synthetic rubber, and upper and lower sealing sheets or dams 12 and 13 respectively. The sealing sheets or covers 12 and 13 may likewise be made from rubber-like material, in which case they are preferably secured to the cellular body 11 by an adhesive cement while stretched under tension. Alternatively, however, the cellular body 11 may be used, such as for shoe insoles or for anti-fatigue floor mats, without one or both of the sealing sheets 12 and 13, in which case the leather outer and inner soles or the flexible floor covering, as the case may be, are cemented directly to the opposite sides of the cellular structure 11 in order to seal the air within the cells.

The cellular body 11 is provided with upper and lower cells 14 and 15 extending inwardly from the upper and lower walls 16 and 17 respectively, toward the opposite sides of the body 11 and having common partition walls 18 (Figure 2) of approximately uniform thickness. The upper cells 14 are of approximately frusto-conical shape, as shown by a comparison of Figures 2 and 3, which are vertical sections through the body 11 in planes 45 degrees apart. The lower cells 15, on the other hand, are of modified cylindrical form, the shape of which may be described as approximately cylindrical except where their side walls are intersected by the conical side walls of the upper cells 14, as shown in Figures 4 and 5.

In particular, the upper cells 14 have frusto-conical side surfaces 19 sloping downward toward a circular bottom surface 20 on the inner side of the lower wall 18, the side surfaces 19 in turn sloping upward from the circular boundary of maximum diameter 21 to the mouth 22 in an oppositely-directed frusto-conical surface 23, forming a part of the upper wall 16. Described geometrically, the side surfaces 19 and 23 are thus symmetrical surfaces of revolution, formed by a pair of lines arranged at an acute angle to one another which is very nearly a right angle, sweeping in a circular path around a vertical line as an axis of revolution. The upper wall 16 at the mouths 22 of the upper cells 14 is thus thinner than at the locations immediately above the lower cells 15 (Figure 2).

The side surfaces of the modified cylindrical lower cells 15, in contrast to the upper cells 14, are not geometrical surfaces of revolution, since their cylindrical portions give way to the frusto-conical upper cells in order to maintain a relatively uniform side wall thickness. In certain vertical planes, such as the oblique planes of Figure 2, the lower cells 15 are of frusto-conical shape and of approximately trapezoidal outline, whereas in a vertical plane rotated 45 degrees from the plane of Figure 2, the lower cells 15 are of roughly cylindrical shape and of approximately rectangular outline (Figure 4). Thus, the bottom surfaces 24 of the bottom cells 15 are approximately lozenge-shaped, with concave arcuate edges 25 where they intersect the conical or frusto-conical surface portions 26. The frusto-conical portions 26 slant or diverge from the bottom 24 to a circular boundary 27 of maximum diameter of the cell 15 and thenceforth converge in a frusto-conical surface 28 toward the circular mouth 29 of the lower cell 15. The side wall surfaces 30 between the frusto-conical portions 26 are of partially cylindrical configuration and roughly triangular in outline. The side surface configuration of the lower cells 15 is somewhat difficult to describe because of the intersecting cones and cylinders involved, and is also difficult to show in two-dimensional drawings, but it is relatively simple and seen at a glance from models or actual mats made according to the invention. In a plane midway between the bottom surface 24 and the mouth 29, as shown in the central portion of Figure 5, a section taken along the line 5—5 in Figure 2, the line of intersection is composed of arcs which are partly convex, as at 31, and partly concave, as at 32. The arcs 31 are convex where the plane intersects the frusto-conical side wall portions 26, whereas the arcs 32 are concave where the plane intersects the cylindrical side wall portions 30.

What I claim is:

1. A pneumatic cellular structure including a resilient body of plate-like form having air cells extending inward from the opposite sides thereof, the partition wall between adjacent cells being of approximately uniform thickness.

2. A pneumatic cellular structure including a resilient body of plate-like form having air cells extending inward from the opposite sides thereof, the cells on one side thereof being arranged side by side in alternation with the cells on the other side thereof, the partition walls between adjacent cells being of approximately uniform thickness.

3. A pneumatic cellular structure including a resilient body of plate-like form having air cells extending inward from the opposite sides thereof, the cells on one side thereof being of approximately frusto-conical shape and the cells on the other side being of deformed cylindrical shape.

4. A pneumatic cellular structure including a resilient body of plate-like form having air cells extending inward from the opposite sides thereof, the cells on one side thereof being of approximately frusto-conical shape and the cells on the other side being of deformed cylindrical shape having partially conical side wall portions and partially cylindrical side wall portions.

5. A pneumatic cellular structure including a resilient body of plate-like form having air cells extending inward from the opposite sides thereof, the partition walls between adjacent cells being of approximately uniform thickness, portions of the side walls of the cells on one side of the body projecting into the cells on the other side thereof.

6. A pneumatic cellular structure including a resilient body of plate-like form having air cells extending inward from the opposite sides thereof, the cells on one side thereof being of approximately frusto-conical shape and the cells on the other side being of deformed cylindrical shape, the partition walls between adjacent cells being of approximately uniform thickness.

7. A pneumatic cellular structure including a resilient body of plate-like form having air cells extending inward from the opposite sides thereof, the partition walls between adjacent cells being of approximately uniform thickness, the cells on one side of the body having constricted mouths.

8. A pneumatic cellular structure including a resilient body of plate-like form having air cells extending inward from the opposite sides thereof, the partition walls between adjacent cells being of approximately uniform thickness, the cells on both sides of the body having constricted mouths.

9. A pneumatic cellular structure including a resilient body of plate-like form having air cells extending inward from the opposite sides thereof, the partition walls between adjacent cells being of approximately uniform thickness, and a sheet-like sealing member secured to at least one side of said body in sealing engagement with the cells thereof.

CLARENCE V. McGUIRE.

REFERENCES CITED

The following references are of record in the file of this patent:

UNITED STATES PATENTS

| Number | Name | Date |
|---|---|---|
| 2,061,569 | Fischer | Nov. 24, 1936 |